United States Patent
Finley et al.

(10) Patent No.: US 7,889,118 B1
(45) Date of Patent: Feb. 15, 2011

(54) RADAR SYSTEM AND METHOD USING PULSE COMPRESSION

(75) Inventors: Jeffery A. Finley, Cedar Rapids, IA (US); Daniel L. Woodell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 115 days.

(21) Appl. No.: 12/235,411

(22) Filed: Sep. 22, 2008

(51) Int. Cl.
G01S 13/08 (2006.01)
(52) U.S. Cl. .................. 342/118; 342/136; 342/27
(58) Field of Classification Search ............... 342/26 B
See application file for complete search history.

(56) References Cited

U.S. PATENT DOCUMENTS

| | | | |
|---|---|---|---|
| 2,930,035 A | 3/1960 | Altekruse | |
| 2,965,894 A | 12/1960 | Sweeney | |
| 2,994,966 A | 8/1961 | Senitsky et al. | |
| 3,153,234 A | 10/1964 | Begeman et al. | |
| 3,212,088 A | 10/1965 | Alexander et al. | |
| 3,241,141 A | 3/1966 | Wall | |
| 3,325,807 A | 6/1967 | Burns et al. | |
| 3,397,397 A | 8/1968 | Barney | |
| 3,739,380 A | 6/1973 | Burdic et al. | |
| 3,815,132 A | 6/1974 | Case, Jr. et al. | |
| 4,665,401 A * | 5/1987 | Garrard et al. | 342/75 |
| 4,760,396 A | 7/1988 | Barney et al. | |
| 5,945,926 A | 8/1999 | Ammar et al. | |
| 7,002,511 B1 * | 2/2006 | Ammar et al. | 342/134 |
| 2003/0156054 A1 * | 8/2003 | Ishii et al. | 342/70 |
| 2003/0193430 A1 * | 10/2003 | Gresham et al. | 342/70 |
| 2005/0104765 A1 * | 5/2005 | Bandhauer | 342/82 |
| 2005/0140542 A1 * | 6/2005 | Ikeda | 342/118 |
| 2005/0156778 A1 * | 7/2005 | Yap | 342/54 |
| 2005/0190100 A1 * | 9/2005 | Hester et al. | 342/174 |
| 2005/0253748 A1 * | 11/2005 | Brookner | 342/74 |

* cited by examiner

*Primary Examiner*—Thomas H Tarcza
*Assistant Examiner*—Timothy A Brainard
(74) *Attorney, Agent, or Firm*—Matthew J. Evans; Daniel M. Barbieri

(57) ABSTRACT

A radar system includes an antenna and has short range detection capability. The radar system includes a receiver coupled to the antenna for receiving a receive signal associated with a pulse compressed transmission signal and a matched filter configured to accumulate at least a portion of the receive signal for a particular range. The portion of the receive signal is associated with a corresponding portion of the pulse compressed transmission signal.

20 Claims, 5 Drawing Sheets

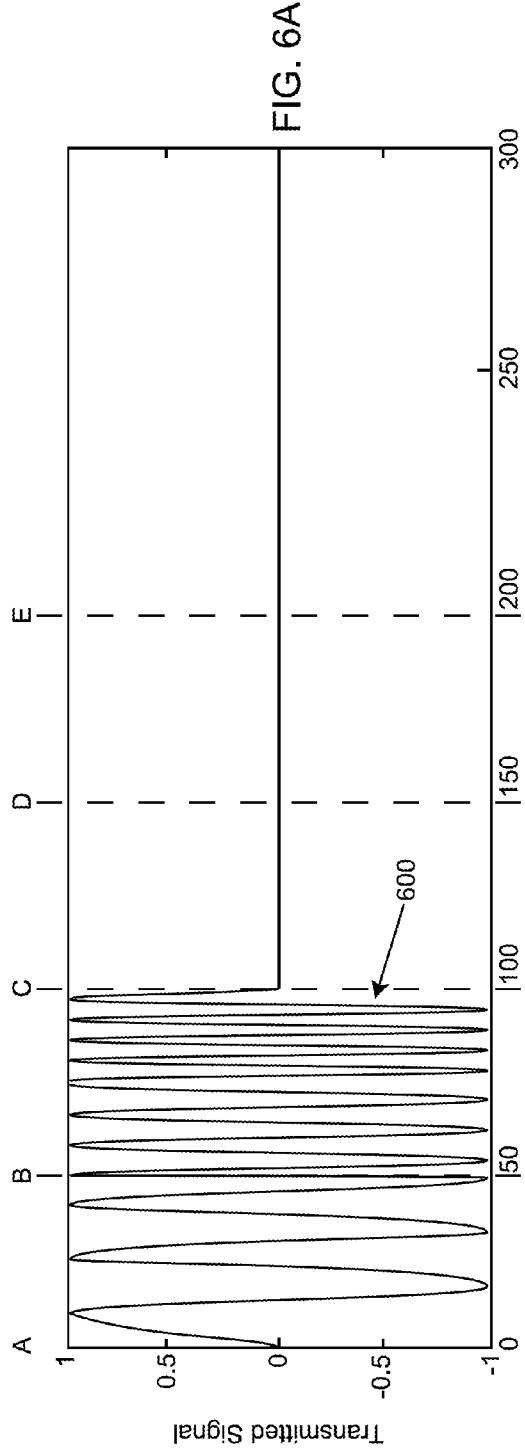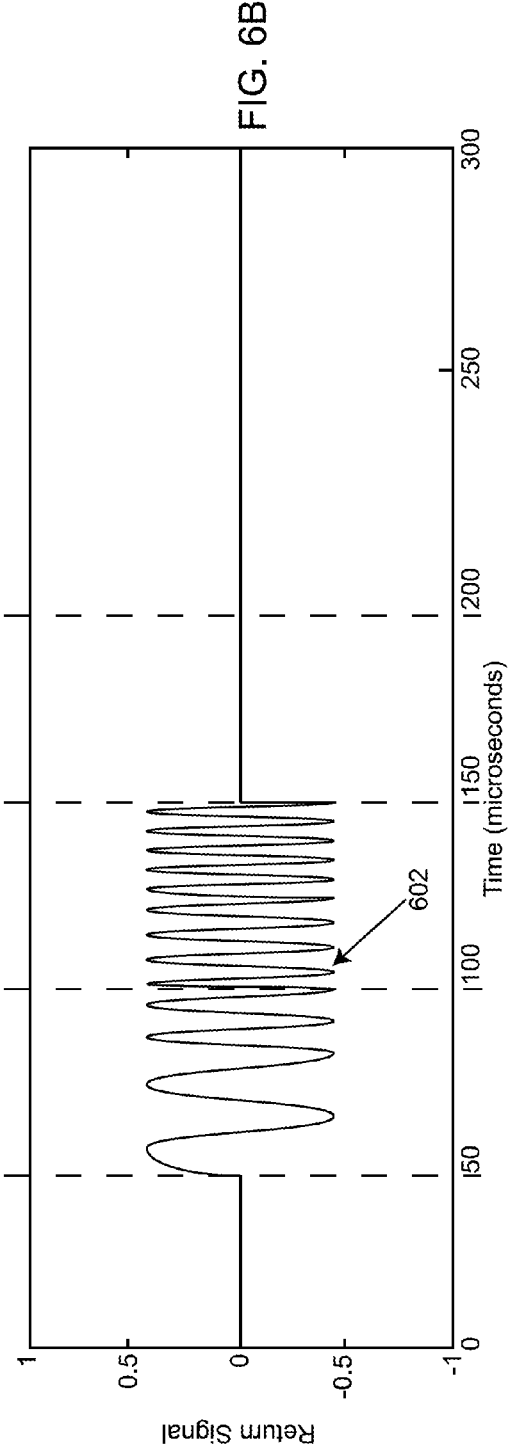

RADAR SYSTEM AND METHOD USING PULSE COMPRESSION

BACKGROUND

The present application relates generally to the field of aircraft radar systems. More specifically, the application relates to aircraft radar systems using pulse compression.

Conventional pulse Doppler radar systems emit a generally uniform, rectangular pulse of energy. The pulse reflects off a target and is received by the radar. By measuring the time between the transmitted signal and the received reflected signal the target range can be obtained. For airborne weather radars, the return signal strength is used to infer the rainfall rate (displayed as green, yellow, and red colors on the flight deck radar display) after being compensated for target range.

A radar pulse and the reflected return signal are not infinitely narrow, even from a point target. In a best case where the radar pulse reflects off a highly reflective point target (effectively a radar mirror) the reflected signal is the same duration as the transmitted pulse, but after going through the radar receiver electronics the received signal includes additional thermal noise and noise associated with the amplifier.

A radar receiver may include a signal accumulator called a "matched filter" to reduce the noise and thus increase the received signal to noise ratio. For purposes of this disclosure, a matched filter is a filter that has a frequency response equal to the complex conjugate of the frequency spectrum of the transmitted pulse. Other less complex and less exact filters are also used that only approximate the matched filter response. For example, the matched filter for a rectangular transmit pulse can be approximated by a running average accumulator with a running average duration equivalent to the length of the transmit pulse. This increases the available target signal to noise ratio compared to a un-filtered received signal. In this approximation for a matched receiver filter, a rectangular return pulse from a point target may be accumulated and then sampled at the end of the accumulation period. The highest sample value may occur when the signal is integrated over the duration of the transmit pulse. The bandwidth of this example rectangular pulse is roughly equal to 1/pulse length. This simple system has a figure of merit of the bandwidth times the pulse length approximately equal to one. A general discussion of pulse lengths and bandwidths for simple pulse systems can be found in chapter 10 of the second edition of Stimson's "Introduction to Airborne Radar", SciTech, 1998.

If the transmit pulse length (and matched filter accumulator duration) is increased, more return signal power can be accumulated in the matched filter. The matched filer for these longer pulses decreases in bandwidth with a B*T ratio still approximately equal to one. The decrease in matched filter bandwidth allows less thermal noise to be processed along with the desired signal. Therefore, increases in transmitter pulse length increase the signal to noise ratio of the received radar signal because both the amount of energy has increased in the transmitter pulse and the amount of noise the desired signal must compete with decreases as the bandwidth is decreased. By increasing the pulse width, the radar system may operate with less transmit power, detect less reflective objects, detect objects at longer ranges, or any combination thereof.

However, if the transmit pulse length is increased, the overall resolution in range decreases. After a very long transmit pulse is accumulated in the matched filter, the aircraft radar system may have difficulty differentiating between reflections that occur at the beginning of the pulse and reflections that occur at the end of the pulse. All the signals are merged into an average in the matched filter.

Pulse compression is a signal processing technique than can be used in radar systems to augment the radar range resolution as well as the signal to noise ratio by modulating the transmitted pulse and correlating the received radar return signal with the transmitted pulse. While compression of radar signals allows higher range resolution to be obtained with longer transmitter pulses, it conventionally has a problem of producing minimum detection ranges much in excess of what a short pulse radar can produce.

Conventionally, increasing the resolution of long pulse radar (i.e., longer than 10 microseconds) is done by modulating the transmitter pulse with some signature and then demodulating the received radar pulse with a matched filter for that same modulation signature. The modulation signature may take many forms including frequency compression, binary coded phase compression, and polyphase coded systems. The modulation process increases the spectral bandwidth occupied by the transmitter pulse.

While the modulation allows higher range resolution than the original long pulse, the entire modulation sequence is used in the demodulation of the received radar signal. If the entire modulation sequence must be sampled, targets must produce returns from the entire sequence. Consider a 100 microsecond long pulse with a 100 microsecond long modulation sequence. If receiving the pulse commences at just after the 100 microsecond long transmitter pulse, radar returns representing the entire modulation sequence can only be sampled at 100 microsecond/12.36 microsecond per nautical mile away, or about 8 nautical miles. Targets at a lesser range will not have produce radar returns containing the entire modulation pattern since those portions of modulated returns could not be received while the radar is still transmitting.

Therefore, what is needed is a radar system capable of using pulse compression to allow long pulse lengths while achieving both high range resolution and producing return power estimates from ranges shorter than either the pulse length or the matched filtered return pulse length. What is also need is a radar system and method that can accurately differentiate between reflections that occur at the beginning of the pulse and reflections that occur at the end of the pulse while increasing the signal to noise ratio, operating with less transmit power, detecting less reflective objects, detecting objects at longer ranges, or any combination thereof.

SUMMARY

One embodiment of the application relates to a radar system including an antenna and having short range detection capability. The radar system includes a receiver coupled to the antenna for receiving a receive signal associated with a pulse compressed transmission signal and a matched filter configured to accumulate at least a portion of the receive signal for a particular range. The portion of the receive signal is associated with a corresponding portion of the pulse compressed transmission signal.

Another embodiment of the application relates to an aircraft radar system for receiving a receive signal associated with a pulse compressed transmission signal. The aircraft radar system includes a processor for determining a presence of a target in response to data. The processor accumulates at least a portion of the receive signal using a matched filter configured for a particular range. The portion of the receive signal is associated with a corresponding portion of the pulse compressed transmission signal.

Another embodiment of the application is related to a method of detecting a target using a radar system. The method includes providing a radar pulse, the pulse having a width. The method also includes receiving a return associated with the radar pulse. The return includes energy from the target and the target can be at a distance less than the width multiplied by half the speed of the pulse. The method also includes accumulating portions of the return associated with portions of the radar pulse from different rages and detecting a presence of the target at the distance less than the pulse width multiplied by half the speed of the pulse using data associated with the portions of the return.

BRIEF DESCRIPTION OF THE DRAWINGS

The disclosure will become more fully understood from the following detailed description, taken in conjunction with the accompanying drawings, wherein like reference numerals refer to like elements, in which:

FIG. 6A is a chart illustrating the waveform of a transmitted signal in the radar system of FIG. 3 according to an exemplary embodiment.

FIG. 6B is a chart illustrating the waveform of a return signal in the radar system of FIG. 3 according to an exemplary embodiment.

DETAILED DESCRIPTION OF THE EXEMPLARY EMBODIMENTS

Figure 1:
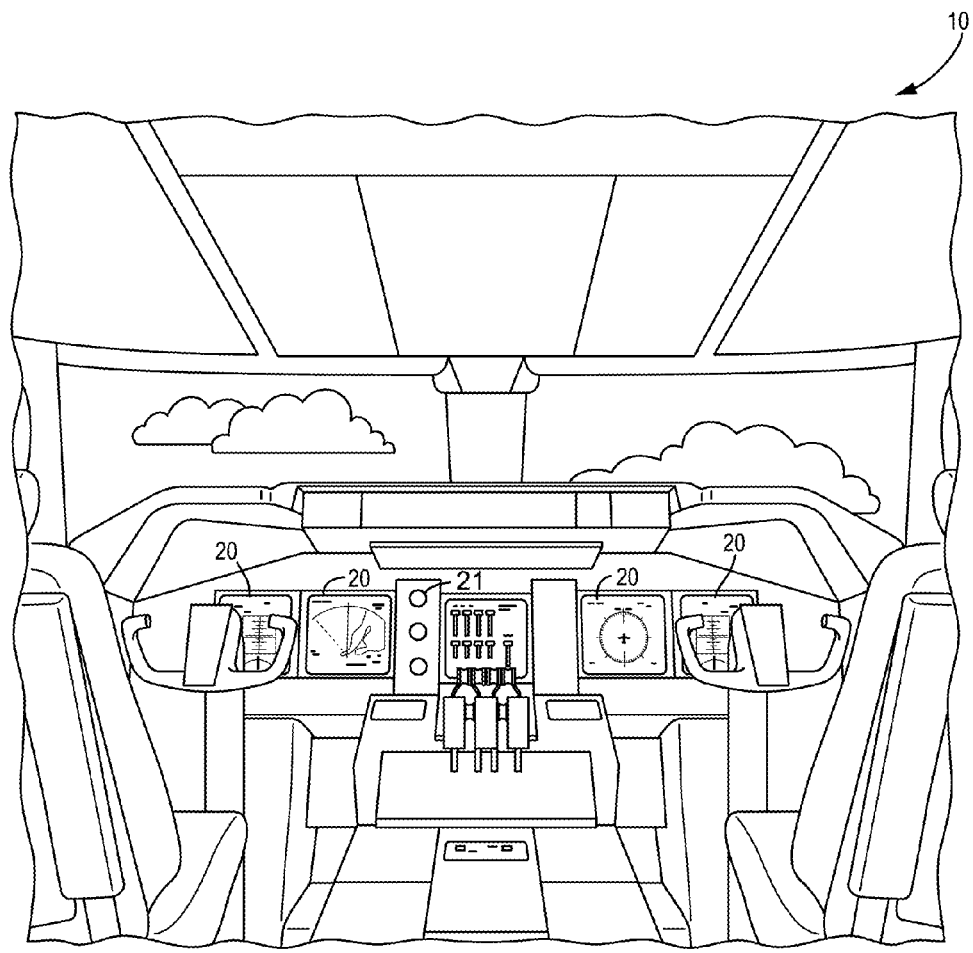
FIG. 1 is an illustration of an aircraft control center or cockpit according to an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, an illustration of an aircraft control center or cockpit 10 is shown, according to one exemplary embodiment. Aircraft control center 10 includes flight displays 20. Flight displays 20 can be used to provide information to the flight crew, thereby increasing visual range and enhancing decision-making abilities.

In an exemplary embodiment, flight displays 20 can provide an output from a radar system of the aircraft. Flight displays 20 can include a weather display, a joint display, a weather radar map and a terrain display. Further, flight displays 20 may include an electronic display or a synthetic vision system (SVS). For example, flight displays 20 can include a display configured to display a three dimensional perspective image of terrain and/or weather information. Other view of terrain and/or weather information may also be provided (e.g. plan view, horizontal view, vertical view, etc.). Additionally, flight displays 20 can be implemented using any of a variety of display technologies, including CRT, LCD, organic LED, dot matrix display, and others. Flight displays 20 can also include head-up displays (HUD) with or without a projector.

Aircraft control center 10 additionally includes one or more user interface (UI) elements 21. UI elements 21 can include dials, switches, buttons, touch screens, or any other user input device. UI elements 21 can be used to adjust features of flight displays 20, such as contrast, brightness, width, and length. UI elements 21 can also (or alternatively) be used by an occupant to interface with or change the displays of flight displays 20. UI elements 21 can additionally be used to acknowledge or dismiss an indicator provided by flight displays 20. Further, UI elements 21 can be used to correct errors on the electronic display.

Figure 2:
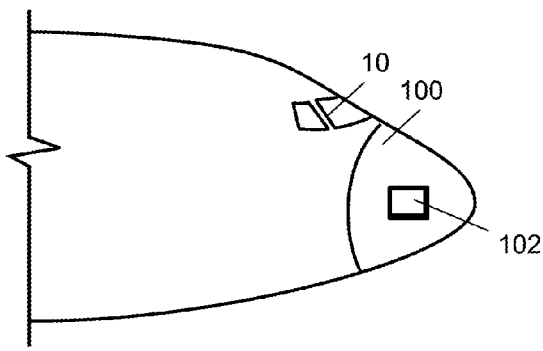
FIG. 2 illustrates a front portion of an aircraft including an aircraft control center and nose according to an exemplary embodiment.

Referring to FIG. 2, the front of an aircraft is shown with aircraft control center 10 and nose 100, according to an exemplary embodiment. A radar system 102 is generally located inside nose 100 of the aircraft or inside a cockpit of the aircraft. According to other exemplary embodiments, radar system 102 can be located on the top of the aircraft or on the tail of the aircraft. Yet further, radar system 102 can be located anywhere on the aircraft. Furthermore, the various components of radar system 102 can be distributed at multiple locations throughout the aircraft. Additionally, radar system 102 can include or be coupled to an antenna system of the aircraft.

Figure 3:
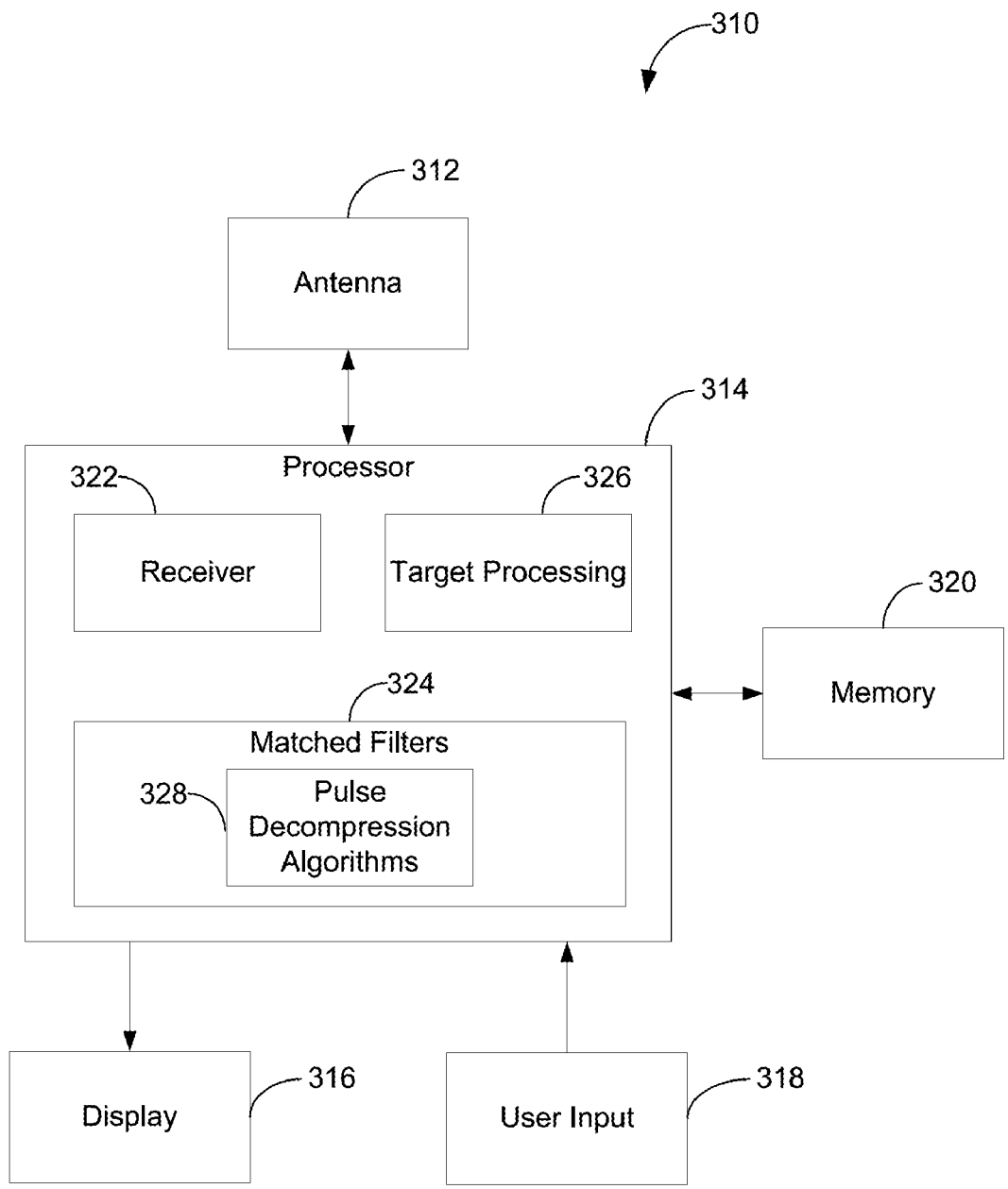
FIG. 3 is a block diagram of an aircraft radar system according to an exemplary embodiment.

Referring to FIG. 3, a hazard warning system or radar system 310 is configured to use a long transmitter pulse having a similar range resolution as a conventional long compressed pulse and having a much shorter initial range sampled by the radar than a conventional long pulse or compressed long pulse radar according to various exemplary embodiments. Aircraft radar system 310 may have improved capability to sample at very short ranges. Aircraft radar system 310 includes radar antenna 312, a processor 314, a display 316, a user input 318, and a memory 320. Aircraft radar system 310 may acquire radar reflectivity profiles from radar antenna 312.

Processor 314 is generally configured to process data received from radar antenna 312 to determine a hazard threat level, receive input from user input 318, and provide hazard indication on display 316. Processor 314 includes a receiver 322, one or more matched filters 324, and a target processing module 326. Alternatively, system 310 can be used for targeting and guidance, terrain avoidance, etc.

Receiver 322 is coupled to antenna 312 and is configured to receive a pulse compressed signal. The pulse compressed signal may include multiple portions, for example the signal may be divided into halves, thirds, quarters, or any smaller division with N portions. According to one exemplary embodiment, the portions may be detected sequentially by receiver 322.

Matched filters 324 may include one or more matched filters, for example a series of matched filters, where each matched filter is designed to accumulate the return signal from an object at a specific range. Matched filters 324 each include one or more pulse decompression algorithms. Regardless of the specific object range, the pulse decompression algorithms allow the range to be detected with the same high resolution. In frequency domain, decompression occurs when the frequency response of the receive signal is multiplied by the frequency response of the matched filter. The matched filter has a frequency response equal or about equal to the complex conjugate of the frequency response of the modulated transmit pulse.

In one exemplary embodiment, a matched filter may be designed to correspond to the entire transmitted pulse. This filter is used to accumulate the receive signal during any period of time starting at the end of the transmitted pulse and having duration the same as the transmitted pulse. If the matched filter is applied to the portion of the received signal starting at some time after the end of the transmitted pulse and having duration the same as the transmitted pulse, the range associated with the filter output corresponds to half the speed of the pulse multiplied by the sum of the transmit pulse width and the duration between the end of the transmitted pulse and the start of the received pulse.

If the matched filter in this exemplary embodiment is applied to the received signal starting immediately at the end of the transmitted pulse and having duration the same as the transmitted pulse, the range associated with the filter output corresponds to the pulse width multiplied by half the speed of the pulse. This range is the minimum range a conventional radar system can detect using this pulse compressed system.

In another exemplary embodiment, a matched filter may be designed to correspond to the latter portion of the transmitted pulse with duration "d" which is less than the transmitted pulse width. If this filter is applied to the received signal starting immediately at the end of the transmitted pulse and having duration "d", then the range associated with the radar output is half the speed of the pulse multiplied by the difference between the pulse width and the duration "d".

According to one exemplary embodiment, matched filters 324 may be implemented in software executed by processor 314. The software may be stored locally in processor 314 or may be stored in memory 320. According to another exemplary embodiment, matched filters 324 may be hardwired as analog and/or digital circuitry in processor 314 or coupled to processor 314. According to alternative embodiments, matched filters 324 may be a single filter that can be changed or reprogrammed to have characteristics of multiple matched filters.

Target processing module 326 is configured to determine the presence of a target (e.g., weather target, terrain target, obstacle, etc.) in response to data associated with one or more portions of the pulse compressed signal received by receiver 322. Target processing module 326 may be capable of detecting targets at a close range, for example within about 1 nautical mile, within about 0.5 nautical miles, within about 0.1 nautical miles, etc. According to various exemplary embodiments, target processing module 326 may determine the presence of a target using a single portion of the pulse compressed receive signal, using multiple accumulated portions of the pulse compressed receive signal, using a non-pulse compressed signal, or any combination thereof. According to various exemplary embodiments, the target processing module may detect a target based on return data from radar antenna 312, data or commands from user input 318, and/or data or instructions from memory 320.

According to various exemplary embodiments, processor 314 can be any hardware and/or software processor or processing architecture capable of executing instructions and operating on data related to hazard detection. According to one exemplary embodiment, memory 320 may be an inertial memory or inertial memory system. The inertial memory or inertial memory system may be any memory or memory system in which data storage and extraction compensates for the translational and/or rotational movement of the aircraft. According to various exemplary embodiments, memory 320 can be any volatile or non-volatile memory capable of storing data and/or instructions related to aircraft radar system 310.

Processor 314 can process data to provide hazard detection indications on display 316, for example precipitation, lightning, hail, turbulence, terrain, ground structures, etc. In addition, processor 314 can cause system 310 to perform further analysis in light of information from user input 318 or memory 320. The further analysis can even include causing system 310 to perform radar queuing and control in azimuth and elevation as well as examining new data or historical data.

According to various exemplary embodiments, pulse decompression algorithms 328 may be used to take advantage of the increased signal accumulation associated with longer pulse length and improve range resolution as compared with longer non-compressed pulses. Pulse decompression algorithms 328 may allow less expensive, lower power transmitters (e.g., for antenna 312) to be used to detect small targets with high resolution.

In a pulse compressed radar the transmit signal is not a uniform pulse. Instead, the transmit signal is modulated. The modulation can be a frequency modulation that varies linearly over the duration of the transmit pulse (e.g., linear FM chirp), a fixed pattern phase modulation (e.g., 180 degree modulation (binary phase shift keying)), amplitude modulation, or in a variety of other modulation methods.

For example, if a frequency modulated transmit signal reflects off a point target (as discussed previously), the reflected signal received by the radar may have the same modulation as the transmitted signal. If the modulation is ignored, a simple rectangular matched filter that accumulates over the duration of the pulse width can be applied and the sample signal may have the same characteristics as if the pulse was not modulated. Since the return signal is modulated, however, it can be compared to, lined up with, or matched with the transmitted signal and the range resolution may be increased to the resolution of the radar's ability to line up the received signal with the transmitted signal. The resolution improvement may be a function of the modulation bandwidth.

Assuming a similar pulse width, transmit power, target reflectivity and range, a pulse compressed radar may be capable of resolving features in range better than a radar with non-modulated rectangular pulses. The signal to noise ratio from a pulse compressed radar observing a single narrow target (e.g., a target depth smaller than the radar pulse width) is generally higher than the corresponding return from a radar with a non-modulated rectangular pulse of the same width. The signal to noise ratio from a pulse compressed radar observing a wide target (e.g., a target depth larger than the radar pulse width) is generally slightly lower than the corresponding return from a radar with a non-modulated rectangular pulse of the same width. As with a non compressed signal, the signal to noise ratio for both wide and narrow targets increases as the width of the transmit pulse increases.

Because pulse compression provides higher range resolution, a radar system may generate a long, modulated pulse that gives a high signal to noise ratio but still has good range resolution for small targets. However, the radar may not be able to receive and transmit simultaneously. Conventionally, the receiver may wait for a time corresponding to at least the width of the transmit pulse before beginning to accumulate the return signal. For an improved signal to noise ratio, the matched filter may then accumulate the return signal for the length of the pulse. In a radar system, time is proportional to distance and if an optimal matched filter is implemented and the radar begins accumulating return signal immediately after the transmit signal is complete, the closest object or target that can be detected by the radar may be the distance corresponding to a round trip return time of one transmit pulse (e.g., about 150 meters per microsecond). For a pulse width of 100 microseconds, the closest object that can be detected by the radar may be about 15,000 meters or about 8.1 nautical miles (nmi). Typically, airborne weather radars must be capable of detecting objects within 0.5 nmi. Conventionally, the transmit pulse must be narrower to detect objects within 0.5 nmi, however, a narrow pulse width generally reduces the overall signal to noise ratio.

According to another exemplary embodiment, a radar system can have a long pulse width and thus provide good signal to noise ratio at long range while being capable of extracting a signal from objects or targets at ranges closer than one pulse width.

For example, a modulated pulse with a pulse width of 100 microseconds may be used. Conventionally, the matched filter would begin accumulating signals as soon as practical after the end of the transmit pulse. If a point target were placed 8.1 nmi from the transmitter, then at the end of the transmit pulse the receiver would begin to see the reflected energy from the start of the transmit pulse. The receiver would continue to receive the reflection (and would continue to accumulate the reflection in the matched filter) for 100 microseconds after the end of the transmit pulse.

If the point target is moved to within 4.05 nmi of the transmitter, for example, just after the transmitter pulse ends the receiver would see the reflected energy from the last half the transmitter pulse. The receiver would continue to receive the reflection (and would continue to accumulate the reflection in the matched filter) for 50 microseconds after the end of the transmit pulse. If a matched filter were designed specifically to accumulate the last half of the transmitter pulse, then an optimal signal to noise ratio and high resolution could be obtained. This technique can be extended to objects that lie very close to the receiver (e.g., 0.5 nmi).

A series of matched filters can be applied to the signal just after the transmit pulse ends. The filters may be optimized for a range of distances from 0.5 nmi up to a range equivalent to the round trip return time of the entire pulse (e.g., pulse width multiplied by half the speed of the pulse) to obtain the short range resolution at that optimized distance. After a time corresponding to one pulse width, a full matched filter may be applied to all subsequent received signals. At very close ranges, less signal may be accumulated and the overall signal power may decrease linearly as the width of the matched filter decreases. Fortunately, the strength of the return signals may be high at close range and the strength of nearby weather targets typically increases in square law as function of decreasing range. The strength of the return signals for ground targets generally increases with the third law as a function of decreasing range. Therefore, power compensation algorithms can produce radar displays with generally uniform power presentation over all ranges.

For example, for nearby beam filling weather targets, received radiation intensity generally drops as a function of the square of increasing range. Doubling the range may drop the radiation intensity by a factor of 1 divided by 2 squared or ¼. A point target or a far away weather target may produce radar return power back at the receiving antenna as an inverse function of the fourth law of increasing range. Ground targets generally do not scatter the entire pulse volume back to the radar, but they do scatter energy back across the entire beam width and so ground returns may produce radar return power back at the receiving antenna as an inverse function of the third law of increasing range. Therefore, the strength of the return signals can be characterized as $$\frac{1}{R^4}$$

for point targets, $$\frac{1}{R^3}$$

for area targets such as ground targets, and $$\frac{1}{R^2}$$

for beam filling weather targets.

The series of matched filters can include pulse decompression algorithms to provide about the same high resolution range returns as if the full pulse width was being decompressed.

Figure 4:
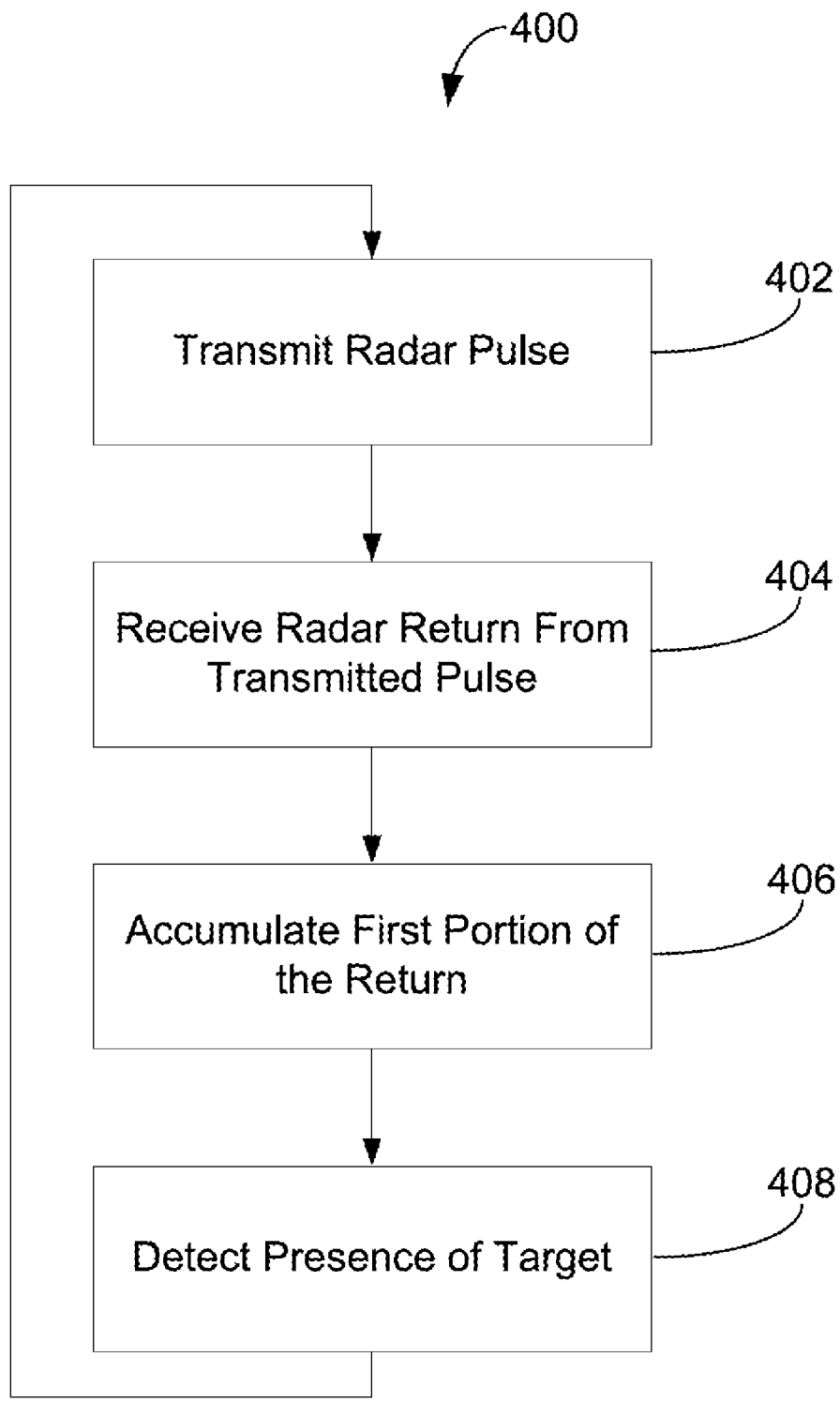
FIG. 4 is a process flow diagram of a method for detecting a target using the radar system of FIG. 3 according to an exemplary embodiment.

Referring to FIG. 4, a method 400 may be executed by processor 314 to detect a target using radar system 310. Radar system 310 transmits or provides a radar pulse (step 402) that has a pulse width, for example a pulse compressed transmission signal. According to an exemplary embodiment, the pulse width may be for a long pulse signal (e.g., at least 100 microseconds, between about 1 and 100 microseconds, between about 10 and 100 microseconds, etc.). According to another exemplary embodiment, the pulse width may be for a short pulse signal (e.g., less than about 100 microseconds, less than about 10 microseconds, less than about 1 microsecond, etc.).

Radar system 310 receives a pulse compressed radar return associated with the transmitted pulse (step 404). The radar return includes energy from the target (e.g., weather target, terrain target, obstacle, etc.). According to one exemplary embodiment, the target can be at a distance less than or equal to the pulse width multiplied by half the speed of the pulse.

Radar system 310 accumulates the received signal with a matched filter which corresponds with a portion of the pulse compressed transmitted signal and which corresponds to a specific target range (step 406). The portion of the transmitted signal represented by the matched filter may be less than the entire transmitted pulse width. A series of matched filters corresponding to N various portions of the pulse compressed transmitted signal (e.g. two portions, three portions, four portions, or any number of portions) and corresponding to N target ranges can be applied to the received signal.

Radar system 310 detects the presence of a target at the distance (e.g., less than the pulse width multiplied by half the speed of the pulse) using data associated with the first accumulated portion (step 408). The detected target may be displayed on display 316 with any other detected targets and radar system 310 may return to step 402 and transmit another pulse.

Figure 5:
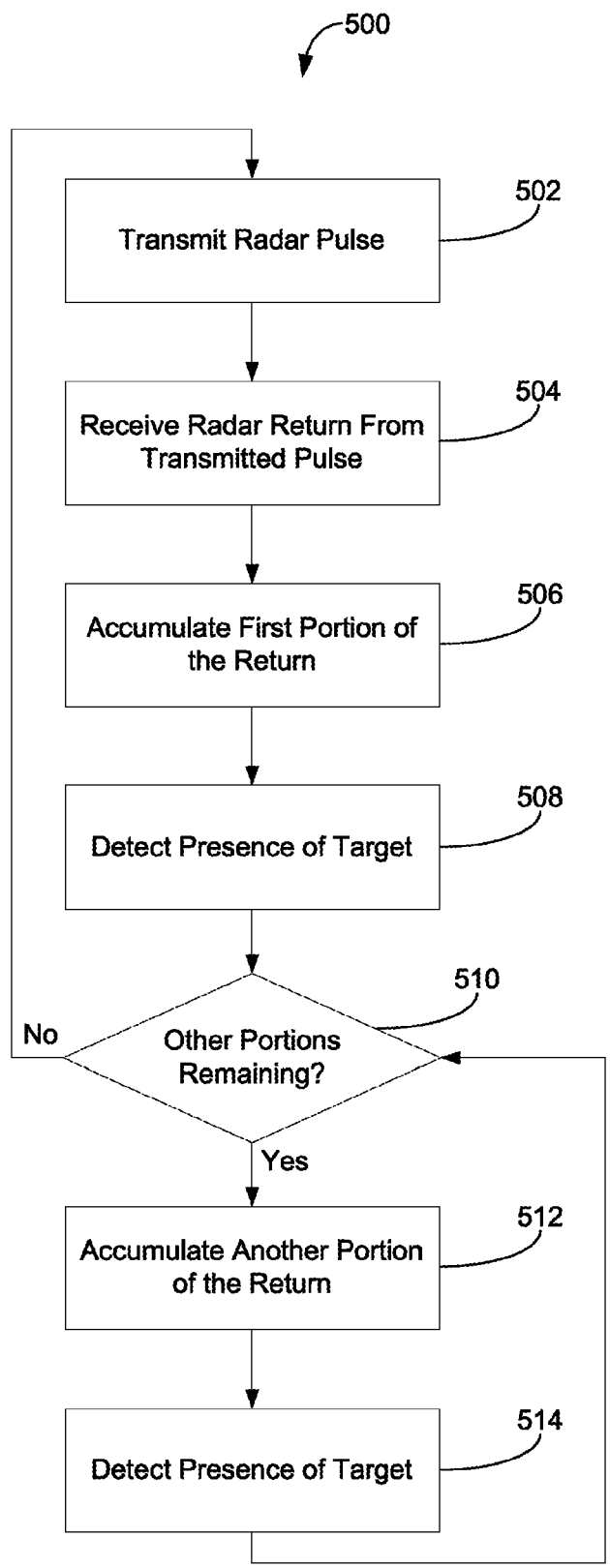
FIG. 5 is a process flow diagram of a method for detecting a target using the radar system of FIG. 3 according to an exemplary embodiment.

Referring to FIG. 5, a method 500 may be executed by processor 314 to detect a target using radar system 310. Radar system 310 transmits or provides a radar pulse (step 502) that has a pulse width, for example a pulse compressed signal. According to an exemplary embodiment, the pulse width may be for a long pulse signal (e.g., at least 100 microseconds, between about 1 and 100 microseconds, between about 10 and 100 microseconds, etc.). According to another exemplary embodiment, the pulse width may be for a short pulse signal (e.g., less than about 100 microseconds, less than about 10 microseconds, less than about 1 microsecond, etc.).

Radar system 310 receives a radar return associated with the transmitted pulse (step 504). The radar return includes energy from the target (e.g., weather hazard, ground hazard, obstacle, etc.). According to one exemplary embodiment, the target can be at a distance less than or equal to the pulse width multiplied by half the speed of the pulse.

Radar system 310 accumulates the received signal with a matched filter which corresponds with a portion of the pulse compressed transmitted signal and which corresponds to a specific target range (step 506). The portion of the transmitted signal represented by the matched filter may be less than the entire transmitted pulse width. A series of matched filters corresponding to N various portions of the pulse compressed transmitted signal (e.g. two portions, three portions, four portions, or any number of portions) and corresponding to N target ranges can be applied to the received signal.

Radar system 310 detects the presence of a target at the distance (e.g., less than the pulse width multiplied by half the speed of the pulse) using data associated with the first accumulated portion (step 508).

Radar system 310 determines whether the radar return will be accumulated at a different range than the range associated with the first accumulated portion (step 510). In the event that another range is required, a matched filter, corresponding to the portion of the pulse compressed transmit signal associated with that range is applied to the receive signal and the receive signal is accumulated (step 512). The further accumulated radar return may be used to detect the presence of a target at the associated range (step 514). This process repeats until all desired ranges associated with all associated portions of the pulse compressed transmitted signal (e.g. up to N portions) are accumulated and associated targets are detected and indicated on display 316. A new pulse is then transmitted (step 502).

According to various exemplary embodiments, the process flow of FIGS. 4-5 may be embodied as hardware and/or software. In exemplary embodiments where the processes are embodied as software, the processes may be executed as computer code on any processing or hardware architecture or in any weather radar system such as the WXR-200 available from Rockwell Collins, Inc.

Referring to FIGS. 6A and 6B, a chart illustrates the waveform of a transmitted signal 600 and a radar return signal in radar system 310 according to an exemplary embodiment. In the illustrated exemplary embodiment, transmitted signal 600 has a pulse that extends about 100 microseconds from time A to time C. The transmitted signal reflects from a target about 7500 meters from the radar and results in return signal 602 extending from time B to time D.

The radar may not be able to receive the first part of the return signal from time B to time C because the radar is still being used for transmission during this time. The earliest a conventional radar detection algorithm would apply a matched filter in to accumulate the signal may be from time C to time E. In this example, the gain resulting from such a matched filter may be low because the return signal is only present during half the period reserved for the accumulation. In addition, a matched filter designed for the entire transmit pulse may poorly match the return signal over period C to E because the return signal contains only a fraction of the transmit signal image. Furthermore, a conventional radar may report the position of the return at about 15,000 meters rather than about 7500 meters because the matched filter may be applied over the period C to E where the signal delay is about 100 microseconds (15,000 meters) rather than the period from B to D where the signal delay is about 50 microseconds (7500 meters).

According to various exemplary embodiments, the return signal 602 over the period from C to E can be accumulated using a series of specially designed matched filters. One filter, the best filter in this case, may represent the image of the transmit pulse over the period from B to C. In addition, a variety of additional matched filters representing the entire range of transmit signal images over a variety of subintervals from A to C can be applied. For example, matched filters can be designed for transmit subintervals from about 25-100 microseconds, from about 50-100 microseconds, and from about 75 to 100 microseconds. These three matched filters may be sequentially applied to the signal received over the period from about 100 to 200 microseconds to assess the possibility that the received signal is reflecting from a target at about 11,250 meters, about 7500 meters, and about 3750 meters respectively. By sequentially applying these matched filters, a profile of returns from objects at a distance from about 0 microseconds (0 meters) to about 100 microseconds (15,000 meters) can be obtained.

While the detailed drawings, specific examples, detailed algorithms and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A radar system including an antenna, the radar system having short range detection capability, the radar system comprising:
    a receiver coupled to the antenna for receiving a receive signal associated with a pulse compressed transmission signal;
    a first matched filter configured to accumulate at least a portion of the receive signal for a particular range, the portion of the receive signal corresponding to less than a full pulse width of the pulse compressed transmission signal, wherein the matched filter is implemented using a first pulse decompression algorithm executed by a processor; and
    a full matched filter corresponding to the full pulse width of the pulse compressed transmission signal, wherein the first matched filter is applied to the receive signal at a time less than twice the pulse width after the pulse compressed transmission signal is provided and the full matched filter is applied to the received signal at a time longer than twice the pulse width after the pulse compressed transmission signal is provided.

2. The radar system of claim 1, wherein the first matched filter is part of a set of first matched filters including four filters using four decompression algorithms corresponding to four equal portions of the pulse compressed transmission signal.

3. The radar system of claim 2, wherein the pulse compressed transmission signal changes from a lower frequency to a higher frequency and the first matched filter is part of a set of filters using pulse decompression algorithms.

4. The radar system of claim 1, further comprising:
a processor for determining a presence of a target at close range in response to data associated with the portion of the receive signal.

5. The radar system of claim 1, further comprising power compensation algorithms for uniform power distribution over a plurality of ranges.

6. The radar system of claim 1, wherein the first matched filter is designed to accumulate the receive signal associated with the last one half of the transmit pulse.

7. The radar system of claim 1 wherein the pulse compression signal has a width of between 1 and 100 microseconds.

8. The radar system of claim 1 wherein the portion of the receive signal is associated with the last half of the pulse compressed transmission signal.

9. An aircraft radar system for receiving a receive signal associated with a pulse compressed transmission signal, the aircraft radar system comprising:
a processor for determining a presence of a target in response to data, the processor accumulating at least a portion of the receive signal using a first matched filter configured for a particular range to provide the data, the portion of the receive signal being associated with a corresponding portion of the pulse compressed transmission signal, wherein the first matched filter is implemented using a first pulse decompression algorithm executed by the processor, wherein the processor is further configured to accumulate the received signal using a full matched filter corresponding to an entire pulse width of the received signal after a full pulse width reception period, the full matched filter being implemented using a second pulse decompression algorithm executed by the processor.

10. The aircraft radar system of claim 9, wherein the first matched filter is part of a series of matched filters, wherein each filter in the series is configured for particular range distances of the pulse compressed transmission signal.

11. The aircraft radar system of claim 10, wherein the matched filters accumulate respective portions of the receive signal, the respective portions being associated with particular respective portions of the pulse compressed transmission signal.

12. The aircraft radar system of claim 9, wherein the aircraft radar system is a weather radar system for use with a display, wherein the processor causes the display to display indications of the targets.

13. The aircraft radar system of claim 12 wherein the targets are terrain targets, weather targets, obstacles, or other airborne objects.

14. The aircraft radar system of claim 9, wherein the pulse compressed transmission signal is a long pulse signal having a width of at least 100 microseconds.

15. The aircraft radar system of claim 9, wherein the pulse compressed transmission signal has a length of between 1 and 100 microseconds and the target is within 0.5 nautical miles.

16. The aircraft radar system of claim 9, wherein the processor matches the modulation of the received signal with a known modulation associated with the pulse compressed transmission signal to determine a range to the target.

17. A weather radar system for detecting a target by providing a radar pulse having a pulse width and receiving a return, the weather radar system comprising:
means for accumulating portions of the return associated with portions of the radar pulse from different ranges after the radar pulse ends and before a pulse width reception period is completed, the means for accumulating including a set of matched filters;
means for accumulating a full return, the means for accumulating the full return including a full matched filter, wherein the full matched filter is applied after the pulse width reception period is completed, wherein the pulse width reception period has a length of the pulse width; and
means for detecting a presence of the target at the distance less than the pulse width multiplied by the speed of the pulse using data associated with the portions of the return from the set of matched filters and detecting a presence of the target at the distance more than the pulse width multiplied by the speed of the pulse using data from the full matched filter associated with the full return.

18. The radar system of claim 17, wherein the set of matched filters includes a set of pulse decompression algorithms.

19. The radar system of claim 18, wherein the means for detecting matches modulation associated with the pulse to modulation on the return.

20. The aircraft radar system of claim 17, wherein the pulse is a long pulse signal having a width of at least 100 microseconds.

* * * * *